United States Patent
Yang et al.

(10) Patent No.: US 9,241,328 B2
(45) Date of Patent: Jan. 19, 2016

(54) DATA TRANSCEIVING METHOD AND APPARATUS FOR SAME

(71) Applicant: LG ELECTRONICS INC., Seoul (KR)

(72) Inventors: Suckchel Yang, Anyang-si (KR); Joonkui Ahn, Anyang-si (KR); Dongyoun Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 129 days.

(21) Appl. No.: 14/122,582

(22) PCT Filed: Oct. 12, 2012

(86) PCT No.: PCT/KR2012/008334
§ 371 (c)(1),
(2) Date: Nov. 26, 2013

(87) PCT Pub. No.: WO2013/055159
PCT Pub. Date: Apr. 18, 2013

(65) Prior Publication Data
US 2014/0086197 A1    Mar. 27, 2014

Related U.S. Application Data

(60) Provisional application No. 61/546,523, filed on Oct. 12, 2011.

(51) Int. Cl.
*H04W 72/04* (2009.01)
*H04L 5/00* (2006.01)
*H04B 7/26* (2006.01)

(52) U.S. Cl.
CPC ........... *H04W 72/042* (2013.01); *H04B 7/2656* (2013.01); *H04L 5/0044* (2013.01); *H04L 5/0053* (2013.01)

(58) Field of Classification Search
CPC .................................................. H04W 72/042
See application file for complete search history.

(56) References Cited

U.S. PATENT DOCUMENTS

| | | | |
|---|---|---|---|
| 2010/0279628 A1* | 11/2010 | Love et al. | 455/70 |
| 2011/0085458 A1* | 4/2011 | Montojo et al. | 370/252 |
| 2011/0228732 A1* | 9/2011 | Luo et al. | 370/329 |
| 2012/0033627 A1* | 2/2012 | Li et al. | 370/329 |
| 2012/0087346 A1 | 4/2012 | Lee et al. | |
| 2012/0113917 A1* | 5/2012 | Gaal et al. | 370/329 |
| 2012/0287878 A1 | 11/2012 | Moon et al. | |

FOREIGN PATENT DOCUMENTS

| | | | |
|---|---|---|---|
| WO | WO 2011/002173 A2 | 1/2011 | |
| WO | WO 2011/065703 A2 | 6/2011 | |
| WO | WO 2011/096742 A2 | 8/2011 | |

* cited by examiner

*Primary Examiner* — Brian D Nguyen
*Assistant Examiner* — Toan Nguyen
(74) *Attorney, Agent, or Firm* — Birch, Stewart, Kolasch & Birch, LLP

(57) ABSTRACT

The present invention relates to a wireless communication system. More particularly, the present invention relates to a method and an apparatus in which a terminal receives downlink data in a wireless communication system. The method comprises: a step of receiving a control channel signal including resource allocation information through a specific time domain of a subframe having a plurality of time domains; and a step of receiving the downlink data through the downlink data channel resource domain scheduled by the resource allocation information within said specific time domain. In cases where the downlink data channel resource domain is overlapped with a common search space, the downlink data is received through the residual resource domain except the portion overlapped with the common search space from among the downlink data channel resource domain.

10 Claims, 13 Drawing Sheets

DATA TRANSCEIVING METHOD AND APPARATUS FOR SAME

CROSS REFERENCE TO RELATED APPLICATIONS

This application is the National Phase of PCT/KR2012/008334 filed on Oct. 12, 2012, which claims priority under 35 U.S.C. 119(e) to U.S. Provisional Application No. 61/546,523 filed on Oct. 12, 2011, all of which are hereby expressly incorporated by reference into the present application.

TECHNICAL FIELD

The present invention relates to a wireless communication system and, more particularly, to a method of transmitting and receiving data and an apparatus for the same.

BACKGROUND ART

Wireless communication systems have been widely deployed to provide various types of communication services such as voice or data. In general, a wireless communication system is a multiple access system that supports communication of multiple users by sharing available system resources (a bandwidth, transmit power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE

Technical Problem

An object of the present invention is to provide a method of efficiently transmitting and receiving data in a wireless communication system and an apparatus for the same. Another object of the present invention is to provide a method of efficiently transmitting and receiving downlink data in a wireless communication system and an apparatus for the same.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an aspect of the present invention, an embodiment of the present invention provides a method for receiving downlink data by a user equipment in a wireless communication system, the method including receiving a control channel signal including resource allocation information through a specific time region in a subframe having a plurality of time regions; and receiving the downlink data through a resource region for downlink data channel scheduled by the resource allocation information in the specific time region, wherein, when the resource region for downlink data channel overlaps a common search space, the downlink data is received through a remaining portion other than a portion overlapping the common search space from among the resource region for downlink data channel.

Another embodiment of the present invention provides a method for receiving downlink data by a user equipment in a wireless communication system, the method including receiving a control channel signal including resource allocation information through a specific time region in a subframe having a plurality of time regions; receiving control information about whether a common search space is used to receive the downlink data; and receiving the downlink data through a resource region for downlink data channel scheduled by the resource allocation information in the specific time region, wherein, when the resource region for downlink data channel overlaps the common search space, in case the control information indicates that the common search space is used to receive the downlink data, the downlink data is received through the resource region for downlink data channel which comprises the common search space, and, in case the control information indicates that the common search space is not used to receive the downlink data, the downlink data is received through a remaining portion other than a portion overlapping the common search space from among the resource region for downlink data channel.

Preferably, when the portion overlapping the common search space from among the resource region for downlink data channel is excluded from receiving the downlink data, puncturing or rate matching may be applied to the portion overlapping the common search space.

Preferably, the control information may be received through the control channel signal.

Preferably, the control information may be received through a Radio Resource Control (RRC) layer message.

In another aspect of the present invention, an embodiment of the present invention provides an apparatus for wireless communication, including a processor; and a radio frequency (RF) unit, wherein the processor is configured to receive a control channel signal including resource allocation information through a specific time region in a subframe having a plurality of time regions, and to receive the downlink data through a resource region for downlink data channel scheduled by the resource allocation information in the specific time region, and, wherein when the resource region for downlink data channel overlaps a common search space, the downlink data is received through a remaining portion other than a portion overlapping the common search space from among the resource region for downlink data channel.

Another embodiment of the present invention provides an apparatus for wireless communication, including a processor; and a radio frequency (RF) unit, wherein the processor is configured to receive a control channel signal including resource allocation information through a specific time region in a subframe having a plurality of time regions, to receive control information about whether a common search space is used to receive the downlink data, and to receive the downlink data through a resource region for downlink data channel scheduled by the resource allocation information in the specific time region, and, wherein when the resource region downlink data channel overlaps the common search space, in case the control information indicates that the common search space is used to receive the downlink data, the downlink data is received through the resource region for downlink data channel which comprises the common search space, and, in case the control information indicates that the common search space is not used to receive the downlink data, the downlink data is received through a remaining portion other than a portion overlapping the common search space from among the resource region for downlink data channel.

Preferably, when the portion overlapping the common search space from among the resource region for downlink data channel is excluded from receiving the downlink data, puncturing or rate matching may be applied to the portion overlapping the common search space.

Preferably, the control information may be received through the control channel signal.

Preferably, the control information may be received through an RRC layer message.

According to the present invention, it is possible to efficiently transmit and receive data in a wireless communication system. Specifically, it is possible to efficiently transmit and receive downlink data in the wireless communication system.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention. In the drawings.

BEST MODE

Embodiments of the present invention may be used in various wireless access systems such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA may be implemented as a radio technology such as Universal Terrestrial Radio Access (UTRA) or CDMA2000. TDMA may be implemented as a radio technology such as Global System for Mobile communications/General Packet Radio Service/Enhanced Data Rates for GSM Evolution (GSM/GPRS/EDGE). OFDMA may be implemented as a radio technology such as IEEE 802.11 (Wi-Fi), IEEE 802.16 (WiMAX), IEEE 802.20, and Evolved-UTRA (E-UTRA). UTRA is a part of Universal Mobile Telecommunication System (UMTS). Third Generation Partnership Project Long Term Evolution (3GPP LTE) is a part of Evolved-UMTS (E-UMTS) using E-UTRA. Long Term Evolution Advanced (LTE-A) is an evolution of 3GPP LTE. For clarity, the description focuses on 3GPP LTE/LTE-A. However, the technical features of the present invention are not limited thereto.

In a wireless communication system, a user equipment receives information from a base station on a downlink (DL) and transmits information to the base station on an uplink (UL). The information transmitted and received between the base station and the user equipment includes data and various types of control information. There are various physical channels according to the types/uses of information transmitted and received between the base station and the user equipment.

Figure 1:
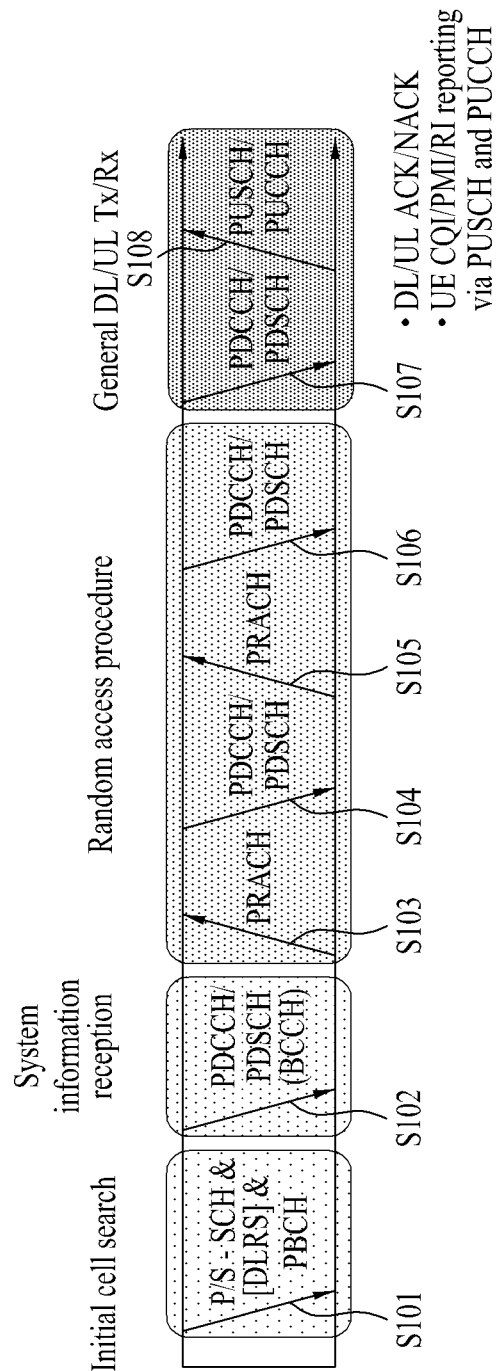
FIG. 1 illustrates physical channels, which may be used in a Third Generation Partnership Project Long Term Evolution (3GPP LTE) system as an example of a wireless communication system, and a general signal transmitting method using the physical channels.

FIG. 1 is a view illustrating physical channels, which may be used in a 3GPP LTE system, and a general signal transmitting method using the physical channels.

When a user equipment is powered on or enters a new cell, the user equipment performs initial cell search for synchronization to a base station at step S101. To this end, the user equipment synchronizes its timing to the base station and acquires information such as a cell identity (ID) by receiving a Primary Synchronization Channel (P-SCH) and a Secondary Synchronization Channel (S-SCH) from the base station. Subsequently, the user equipment may acquire broadcast information in the cell by receiving a Physical Broadcast Channel (PBCH) from the base station. During the initial cell search, on the other hand, the user equipment may monitor a DL channel state by receiving a Downlink Reference Signal (DL RS).

After the initial cell search, the user equipment may acquire more detailed system information by receiving a Physical Downlink Control Channel (PDCCH) and receiving a Physical Downlink Shared Channel (PDSCH) based on information of the PDCCH at step S102.

Subsequently, in order to complete access to the base station, the user equipment may perform a random access procedure at steps S103 to S106. To this end, the user equipment may transmit a preamble on a Physical Random Access Channel (PRACH) (S103) and may receive a response message to the preamble on a PDCCH and a PDSCH corresponding to the PDCCH (S104). In the case of contention based random access, the user equipment may additionally perform a contention resolution procedure including transmission of an additional PRACH (S105) and reception of a PDCCH and a PDSCH corresponding to the PDCCH (S106).

After the above procedure, the user equipment may receive a PDCCH/a PDSCH from the base station (S107) and transmit a Physical Uplink Shared Channel (PUSCH)/a Physical Uplink Control Channel (PUCCH) to the base station (S108) as a general UL/DL signal transmission procedure. Control information that the user equipment transmits to the base station is generically called Uplink Control Information (UCI). The UCI includes a Hybrid Automatic Repeat and reQuest Acknowledgement/Negative Acknowledgement (HARQ-ACK/NACK), a Scheduling Request (SR), and Channel State Information (CSI). The CSI includes a Channel Quality Indicator (CQI), a Precoding Matrix Index (PMI), and a Rank Indication (RI). The UCI is generally transmitted on a PUCCH. In a case in which control information and traffic data are to be transmitted simultaneously, however, the UCI may be transmitted on a PUSCH. In addition, the UCI may be transmitted aperiodically on the PUSCH, according to a request/command of a network.

Figure 2:
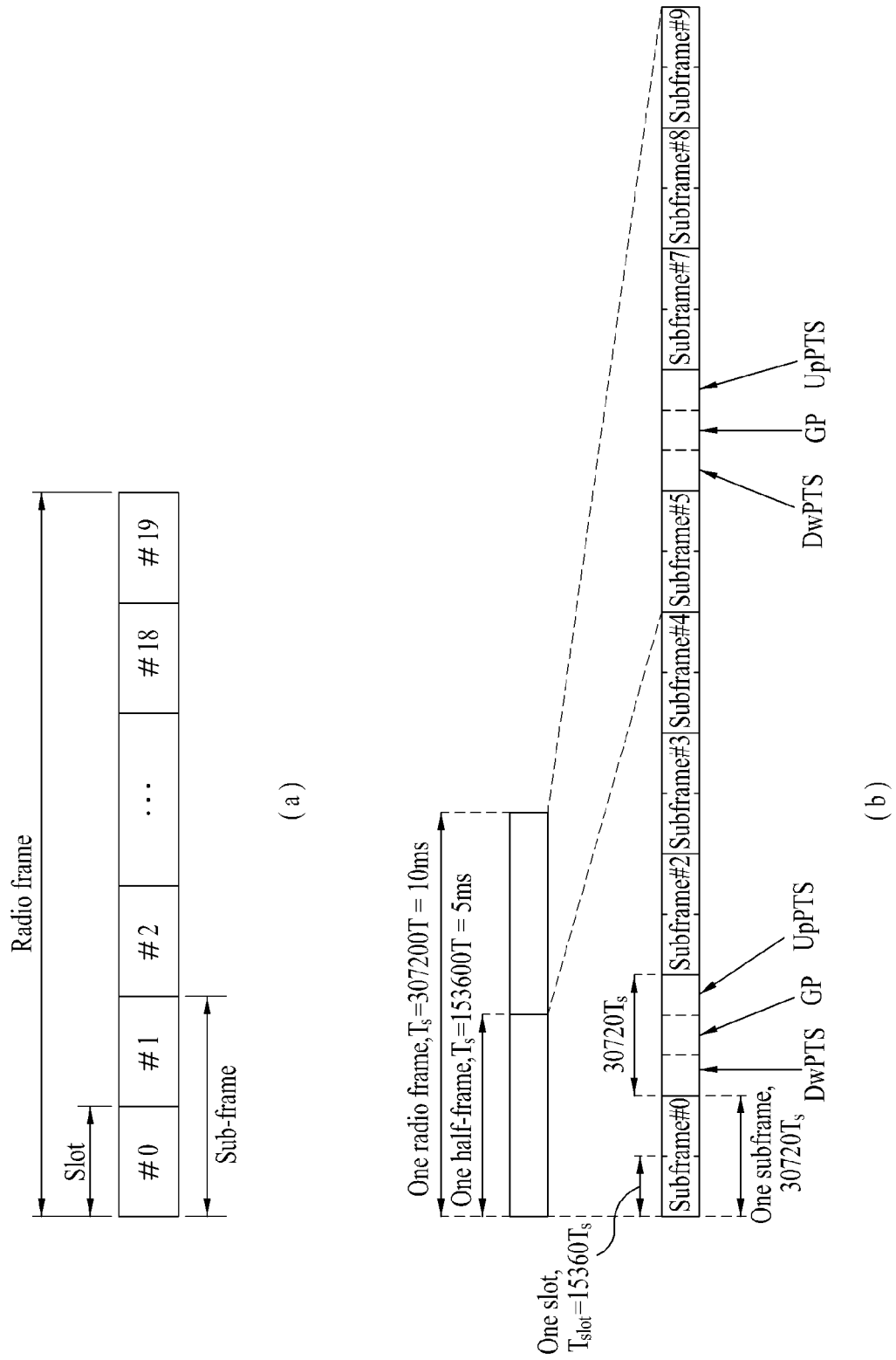
FIG. 2 illustrates a structure of a radio frame.

FIG. 2 illustrates a structure of a radio frame. In a cellular OFDM wireless packet communication system, UL/DL data packet transmission is performed on a per subframe (SF) basis. One subframe is defined as a predetermined time period including a plurality of Orthogonal Frequency Division Multiplexing (OFDM) symbols. In a 3GPP LTE standard, a structure of a type 1 radio frame applicable to Frequency Division Duplex (FDD) and a structure of a type 2 radio frame applicable to Time Division Duplex (TDD) are supported.

FIG. 2(a) illustrates a structure of a type 1 radio frame. A DL radio frame includes 10 subframes. One subframe includes two slots in a time domain. A time required for transmitting one subframe is defined as a transmission time interval (TTI). For example, a length of one subframe may be 1 ms and a length of one slot may be 0.5 ms. One slot includes a plurality of OFDM symbols in the time domain and includes a plurality of Resource Blocks (RBs) in a frequency domain. Since OFDM is used for DL in the 3GPP LTE system, one OFDM symbol represents one symbol period. An OFDM symbol may also be referred to as an SC-FDMA symbol or a symbol period. An RB, as a unit of resource allocation, may include a plurality of contiguous subcarriers in one slot.

The number of OFDM symbols per slot may vary depending on a Cyclic Prefix (CP) configuration. The CP includes an extended CP and a normal CP. For example, in a case in which OFDM symbols are configured based on the normal CP, one slot may include 7 OFDM symbols. On the other hand, in a case in which OFDM symbols are configured based on the extended CP, a length of one OFDM symbol is increased. As a result, the number of OFDM symbols in case of the extended CP is less than that of OFDM symbols in case of the normal CP. For example, one slot may include 6 OFDM symbols in case of the extended CP. In a case in which a channel state is unstable, e.g. in a case in which the user equipment moves at a high speed, the extended CP may be used to further reduce interference between the symbols.

In a case in which the normal CP is used, one subframe includes 14 OFDM symbols since one slot includes 7 OFDM symbols. A maximum of 3 front OFDM symbols of the subframe may be assigned to a Physical Downlink Control Channel (PDCCH) and the other OFDM symbols may be assigned to a Physical Downlink Shared Channel (PDSCH).

FIG. 2(b) illustrates a structure of a type 2 radio frame. The type 2 radio frame includes two half frames. Each half frame includes five subframes. Each subframes includes a Downlink Pilot Time Slot (DwPTS), a Guard Period (GP), and an Uplink Pilot Time Slot (UpPTS). One subframe includes two slots. The DwPTS is used for initial cell search, synchronization, or channel estimation at a user equipment. The UpPTS is used for channel estimation and UL transmission synchronization with a user equipment at a base station. The GP is used to remove UL interference between a UL and a DL caused due to the multi-path delay of a DL signal. Table 1 illustrates an Uplink-Downlink (DL-UL) Configuration of subframes in a wireless frame in a TDD mode.

TABLE 1

| Uplink-downlink configuration | Downlink-to-Uplink Switch-point periodicity | \multicolumn{10}{c}{Subframe number} |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D indicates a downlink subframe (DL SF), U indicates an uplink subframe (UL SF), and S indicates a special subframe. The special subframe includes a DwPTS, a GP, and an UpPTS. Table 2 illustrates special subframe configurations.

TABLE 2

| | \multicolumn{3}{c}{Normal cyclic prefix in downlink} | \multicolumn{3}{c}{Extended cyclic prefix in downlink} |
|---|---|---|---|---|---|---|
| | | \multicolumn{2}{c}{UpPTS} | | \multicolumn{2}{c}{UpPTS} |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The structure of the wireless frame is merely illustrative. The number of subframes included in the wireless frame, the number of slots included in each subframe, or the number of symbols included in each slot may be variously changed.

Figure 3:
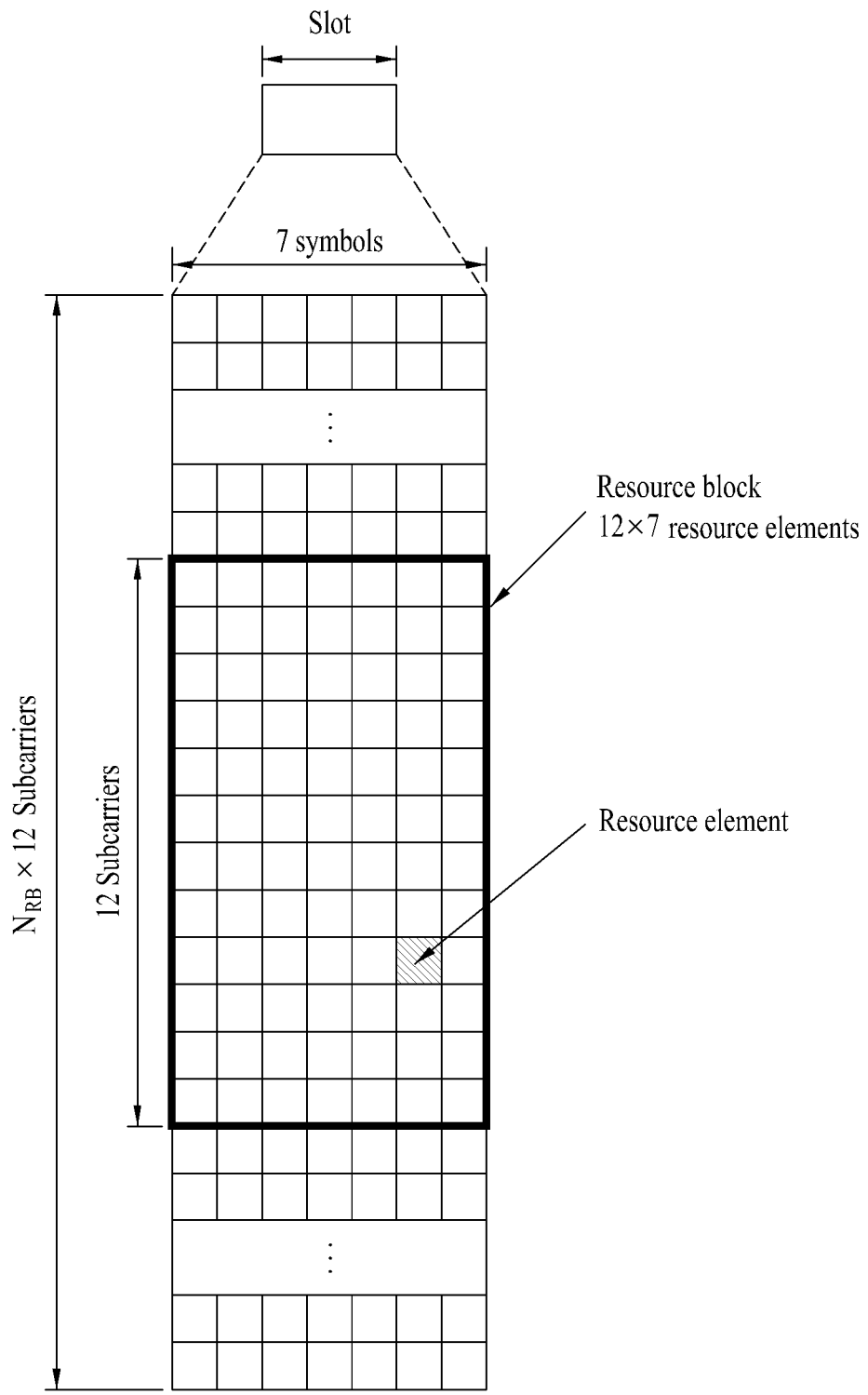
FIG. 3 illustrates a resource grid for a downlink slot.

FIG. 3 illustrates a resource grid for a DL slot.

Referring to FIG. 3, a DL slot includes a plurality of OFDM symbols in the time domain. In the drawing, One DL slot includes 7 OFDM symbols and one resource block (RB) includes 12 subcarriers in the frequency domain. However, the present invention is not limited thereto. Each element on the resource grid is referred to as a resource element (RE). One RB includes 12×7 REs. The number $N_{DL}$ of RBs in a DL slot depends on a DL transmission band. A UL slot may have the same structure as a DL slot.

Figure 4:
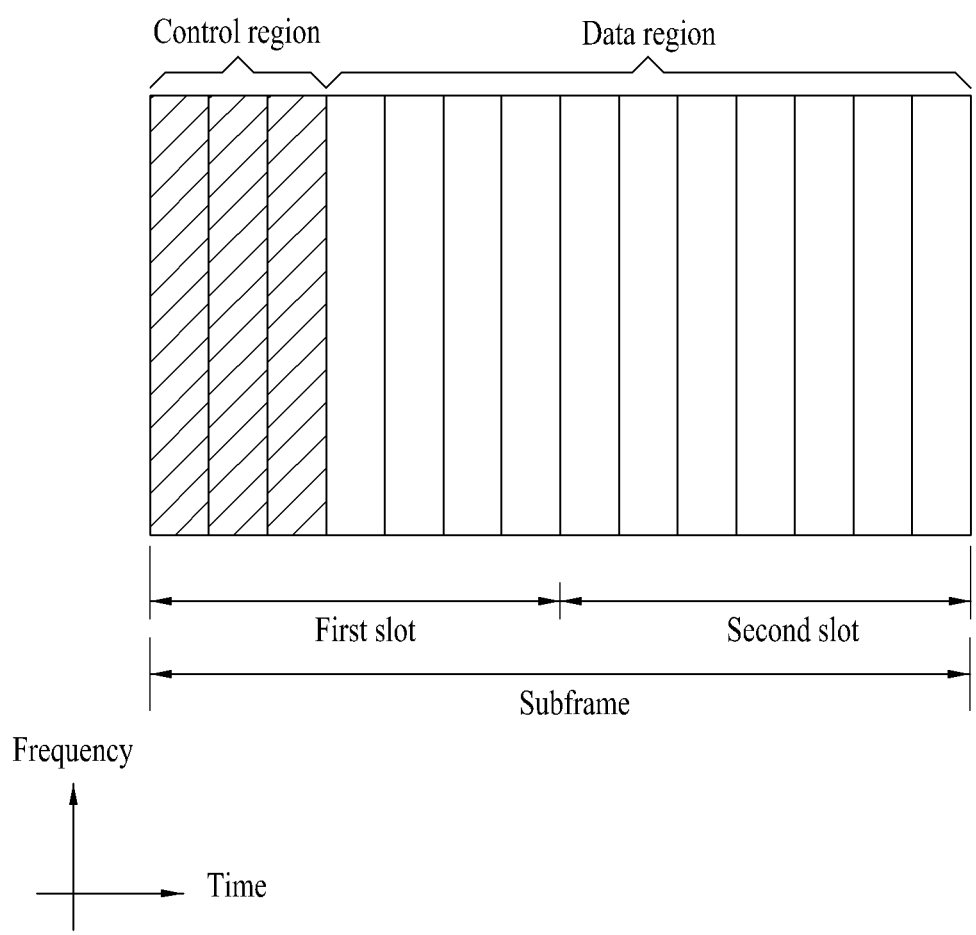
FIG. 4 illustrates a structure of a downlink subframe.

FIG. 4 illustrates a structure of a downlink subframe.

Referring to FIG. 4, the subframe includes a plurality of (for example, two) time regions multiplexed by Time Division Multiplexing (TDM). The first time region may be used to transmit a control signal. The second time region may be used to transmit a data signal. For the sake of convenience, the first time region may be referred to as a control region and the second time region may be referred to as a data region. Specifically, a maximum of 3 (4) front OFDM symbols of the first slot in the subframe correspond to a control region to which control channels are assigned. The other OFDM symbols correspond to a data region to which a Physical Downlink Shared Channel (PDSCH) is assigned. A basic resource unit of the data region is an RB. Examples of downlink control channels used in LTE include a Physical Control Format Indicator Channel (PCFICH), a Physical Downlink Control Channel (PDCCH), and a Physical Hybrid ARQ Indicator Channel (PHICH). The PCFICH is transmitted in the first OFDM symbol of a subframe, carrying information about the number of OFDM symbols used for transmission of control channels in the subframe. The PHICH is a response to a UL transmission, delivering an acknowledgment/negative-acknowledgment (HARQ ACK/NACK) signal. Control information transmitted on the PDCCH is referred to as Downlink Control Information (DCI). The DCI includes UL or DL scheduling information or an UL Transmit Power Control Command for any user equipment group.

DCI formats are defined as formats 0, 3, 3A, and 4 for UL and formats 1, 1A, 1B, 1C, 1D, 2, 2A, 2B, and 2C for DL. Types of information fields, the number of information fields, and the number of bits of each information field vary according to the DCI formats. For example, the DCI formats selectively include information, such as a hopping flag, RB allocation, a modulation coding scheme (MCS), a redundancy version (RV), a new data indicator (NDI), transmit power control (TPC), an HARQ process number, and confirmation of a precoding matrix indicator (PMI) according to use. According to the DCI formats, therefore, the size of control information matched with the DCI formats varies. Meanwhile, any DCI format may be used to transmit two or more kinds of control information. For example, DCI format 0/1A is used to carry DCI format 0 or DCI format 1. These formats may be differentiated by a flag field.

The PDCCH may deliver information about a transport format and resource allocation for a Downlink Shared Channel (DL-SCH), information about resource allocation for an Uplink Shared Channel (UL-SCH), paging information of a paging channel (PCH), system information on the DL-SCH, information about resource allocation for an upper layer control message such as a random access response transmitted on the PDSCH, a transmit power control command for each individual user equipment of any user equipment group, voice over Internet protocol (VoIP) activation, etc. A plurality of PDCCHs may be transmitted in the control region. The user equipment may monitor a plurality of PDCCHs. A PDCCH is transmitted in an aggregation of one or more consecutive control channel elements (CCEs). A CCE is a logical allocation unit used to provide a PDCCH at a predetermined coding rate based on the state of a radio channel. A CCE corresponds to a plurality of resource element groups (REGs). The format of a PDCCH and the number of available bits for the PDCCH are decided according to the relationship between the number of CCEs and a coding rate provided by the CCEs. The base station decides a PDCCH format according to DCI that will be transmitted to the user equipment and adds a cyclic redundancy check (CRC) to the control information. The CRC is masked by a unique identifier (ID) (referred to as a radio network temporary identifier (RNTI)) according to the owner or use of the PDCCH. In a case in which the PDCCH is destined for a specific user equipment, the CRC may be masked by a unique ID (for example, a cell-RNTI (C-RNTI)) of the user equipment. In another example, in a case in which the PDCCH is destined for a paging message, the CRC may be masked by a paging indication ID (for example, a Paging-RNTI (P-RNTI)). In a case in which the PDCCH is destined for system information (more specifically, a system information block (SIB), which will hereinafter be described), the CRC may be masked by a system information ID (for example, a system information RNTI (SI-RNTI)). In order to indicate a random access response, which is a response to a random access preamble transmitted by the user equipment, the CRC is masked by a random access-RNTI (RA-RNTI).

The PDCCH carries a message known as Downlink Control Information (DCI) and the DCI includes resource allocation or other control information for one user equipment or a user equipment group. In general, a plurality of PDCCHs may be transmitted in one subframe. Each PDCCH is transmitted using one or more control channel elements (CCEs). Each CCE corresponds to 9 sets of 4 resource elements. 4 resource elements are referred to as a resource element group (REG). 4 QPSK symbols are mapped to one REG. A resource element assigned to a reference signal is not included in a REG. As a result, the total number of REGs in a given OFDM symbol varies depending upon whether a cell-specific reference signal is present. The REG concept (i.e. mapping per group, each group including 4 resource elements) is also used in other different DL control channels (PCFICH and PHICH). That is, the REG is used as a basic resource unit of the control region. 4 PDCCH formats are supported as listed in Table 3

TABLE 3

| PDCCH format | Number of CCE (n) | Number of REG | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

CCEs are successively numbered. In order to simplify a decoding process, a PDCCH having a format including n CCEs may start only with a CCE having a number equal to a multiple of n. The number of CCEs used for transmission of a specific PDCCH is decided by the base station according to a channel state. For example, one CCE is sufficient for a PDCCH directed to a user equipment having a good DL channel (for example, a user equipment adjacent to the base station). On the other hand, 8 CCEs may be used for a PDCCH directed to a user equipment in a poor DL channel state (for example, a user equipment adjacent to a cell interface) in order to ensure sufficient robustness. In addition, a power level of the PDCCH may be adjusted based on the channel state.

A method introduced to LTE is to define the position of a restricted set of CCEs in which the PDCCH may be positioned for each user equipment. The position of a restricted set of CCEs in which the user equipment may find its own PDCCH may be referred to as a search space (SS). In LTE, the SS may have a different size for each PDCCH format. In addition, a UE-specific search space and a common search space are separately defined. The UE-specific search space is individually set for each user equipment and a range of the common search space is known to all use equipments. The UE-specific search space and the common search space may overlap for a given user equipment. In a case in which the search space is very small, there are no remaining CCEs if the position of some CCEs is assigned to a search space for a specific user equipment. As a result, the base station may not find CCE resources through which the PDCCH will be transmitted to all available user equipments in a given subframe. In order to minimize a possibility of the above blocking being connected to the next subframe, a UE-specific hopping sequence is applied to the starting position of the UE-specific search space.

Table 4 shows sizes of the common search space and the UE-specific search space.

TABLE 4

| PDCCH format | Number of CCE (n) | Number of candidates in CSS | Number of candidates in USS |
|---|---|---|---|
| 0 | 1 | — | 6 |
| 1 | 2 | — | 6 |
| 2 | 4 | 4 | 2 |
| 3 | 8 | 2 | 2 |

In order to regulate calculation load caused by the total number of times of blind decoding, the user equipment is not required to simultaneously search for all defined DCI formats. In general, the user equipment always searches for format 0 and format 1A in the UE-specific search space. Format 0 and format 1A are of the same size and are differentiated by a flag in a message. In addition, the user equipment may be required to receive an additional format (for example, 1, 1B, or 2 according to a PDSCH transmission mode set by the base station). In the common search space, the user equipment searches for format 1A and format 1C. In addition, the user equipment may be set to search for format 3 or format 3A. Format 3 and format 3A may have the same size and may be differentiated by scrambling a CRC using different (common) identifiers instead of a UE-specific identifier. Transmission modes for configuring a multi-antenna technology and information content of DCI formats are listed below.

Transmission Mode
Transmission mode 1: Transmission from a single base station antenna port
Transmission mode 2: Transmit diversity
Transmission mode 3: Open-loop spatial multiplexing
Transmission mode 4: Closed-loop spatial multiplexing
Transmission mode 5: Multi-user multiple input multiple output (MIMO)
Transmission mode 6: Closed-loop rank-1 precoding
Transmission mode 7: Transmission using a UE-specific reference signal DCI Formats
Format 0: Resource grants for PUSCH transmissions (uplink)
Format 1: Resource allocation for signal codeword PDSCH transmissions (transmission modes 1, 2, and 7)
Format 1A: Compact signaling of resource allocation for signal codeword PDSCH transmissions (all modes)
Format 1B: Compact resource allocation for PDSCH (mode 6) using rank-1 closed loop precoding
Format 1C: Very compact resource allocation for PDSCH (for example, paging/broadcast system information)
Format 1D: Compact resource allocation for PDSCH (mode 5) using multi-user MIMO
Format 2: Resource allocation for PDSCH (mode 4) for closed loop MIMO operation
Format 2A: Resource allocation for PDSCH (mode 3) for open loop MIMO operation
Format 3/3A: Power control commands for PUCCH and PUSCH with a 2-bit/1-bit power adjustment value When considering the above, the user equipment is required to perform a maximum of 44 times of blind decoding in one subframe. Checking the same message using different CRC values requires only trivial additional calculation complexity. For this reason, checking the same message using different CRC values is not included in the number of times of blind decoding.

Figure 5:
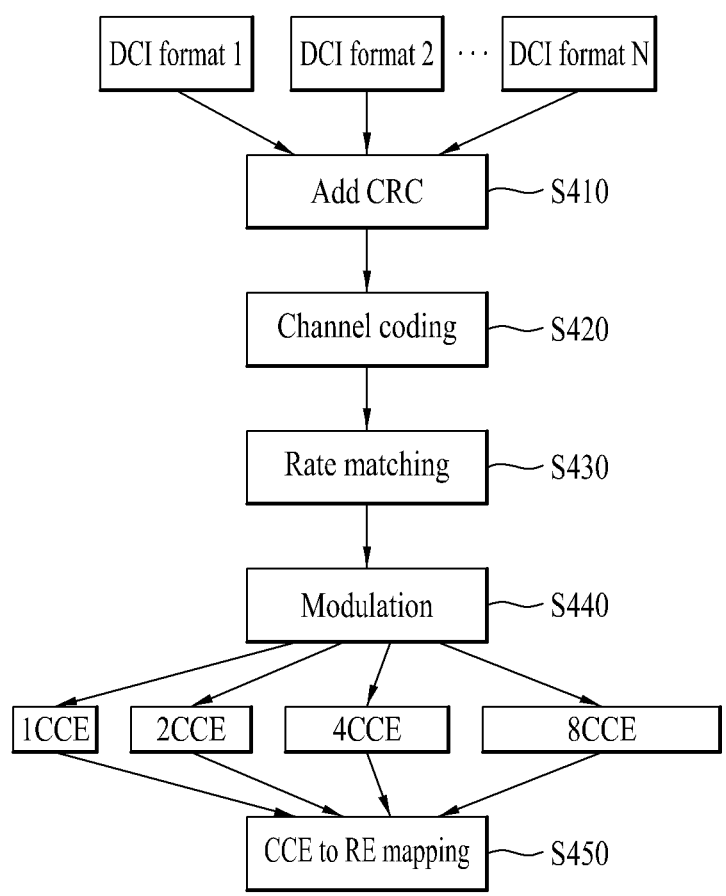
FIG. 5 illustrates a physical downlink control channel (PDCCH) configuration process performed by a base station.

FIG. 5 is a flowchart showing a PDCCH configuration process performed by the base station.

Referring to FIG. 5, the base station generates control information according to DCI formats. The base station may select one DCI format from among a plurality of DCI formats (DCI formats 1, 2, . . . , N) according to control information to be transmitted to the user equipment. At step S410, the base station attaches cyclic redundancy check (CRC) for error detection to control information generated according to each DCI format. The CRC is masked by an identifier (for example, Radio Network Temporary Identifier (RNTI)) according to the owner or use of the PDCCH. In other words, the PDCCH is CRC scrambled by an identifier (for example, RNTI).

Table 5 shows examples of identifiers masked to the PDCCH.

TABLE 5

| Type | Identifier | Description |
|---|---|---|
| UE-specific | C-RNTI, temporary C-RNTI, semi-persistent C-RNTI | Used for unique identification of UE |
| Common | P-RNTI | Used for paging message |
|  | SI-RNTI | Used for system information |
|  | RA-RNTI | Used for random access response |

In a case in which a C-RNTI, a temporary C-RNTI, or a semi-persistent C-RNTI is used, the PDCCH carries control information for a corresponding specific user equipment. In a case in which other RNTIs are used, the PDCCH carries common control information received by all the user equipments in the cell. At step S420, the base station performs channel coding on control information to which the CRC is added to generate coded data (codeword). At step S430, the base station performs rate matching according to a CCE aggregation level assigned to the PDCCH format. At step S440, the base station modulates the coded data to generate modulated symbols. Modulated symbols constituting one PDCCH may have a CCE aggregation level selected from among 1, 2, 4, and 8. At step S450, the base station maps the modulated symbols to physical resource elements (REs) (CCE to RE mapping).

Figure 6:
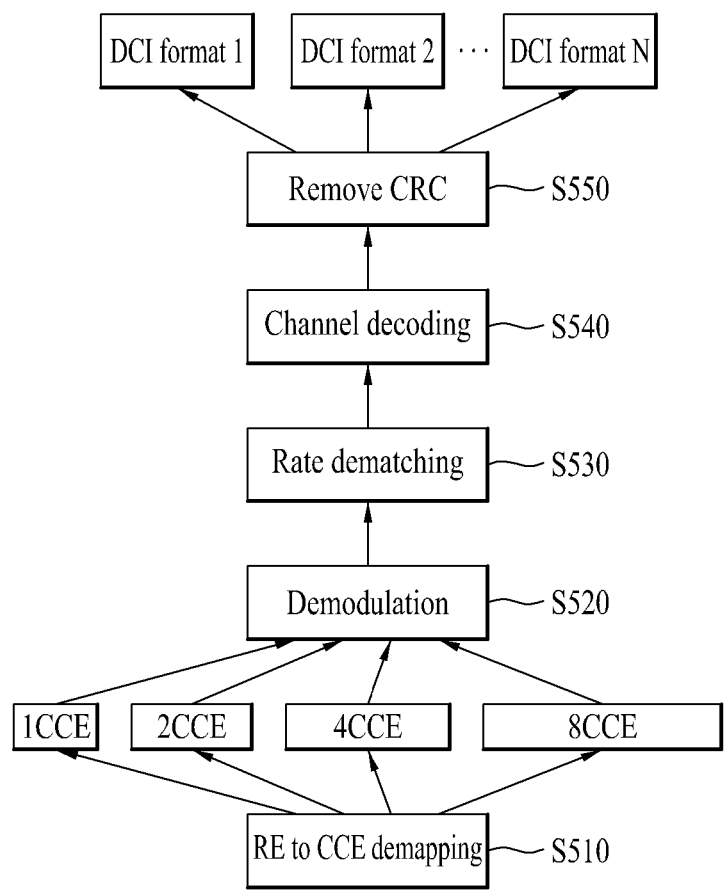
FIG. 6 illustrates a PDCCH processing process performed by a user equipment.

FIG. 6 illustrates a PDCCH processing process performed by the user equipment.

Referring to FIG. 6, at step S510, the user equipment demaps physical resource elements (REs) to CCEs (RE to CCE demapping). At step S520, the user equipment demodulates the respective CCE aggregation level because the user equipment does not know through which CCE aggregation level the user equipment will receive the PDCCH. At step S530, the user equipment performs rate dematching on the demodulated data. Since the user equipment does not know what DCI format (or what DCI payload size) the user equipment that will receive control information has, the user equipment performs rate dematching on the respective DCI format (or DCI payload sizes). At step S540, the user equipment performs channel decoding on the rate dematched data according to a coding rate and checks a CRC to detect whether an error has occurred. In a case in which the error has not occurred, it means that the user equipment detected its own PDCCH. On the other hand, in a case in which the error has occurred, the user equipment continues to perform blind decoding for another CCE aggregation level or another DCI format (or another DCI payload size). At step S550, the user equipment having detected its own PDCCH removes the CRC from the decoded data to acquire control information.

A plurality of PDCCHs for a plurality of user equipments may be transmitted in a control region of the same subframe. The base station does not provide the user equipment with information about the position of a corresponding PDCCH in the control region. Consequently, the user equipment searches for its own PDCCH by monitoring a set of PDCCH candidates in the subframe. Monitoring means the user equipment attempting to decode the received PDCCH candidates according to the respective DCI formats. This is called blind decoding or blind detection. Through blind decoding, the user equipment simultaneously performs identification of the PDCCH transmitted to the user equipment and decoding of control information transmitted through the corresponding PDCCH. For example, if there is no CRC error in a case in which the PDCCH is demasked by a C-RNTI, it means that the user equipment detected its own PDCCH.

Meanwhile, in order to reduce overhead of blind decoding, definition is given such that the number of DCI formats is less than kinds of control information transmitted using the PDCCH. The DCI formats include a plurality of different information fields. Types of information fields, the number of information fields, and the number of bits of each information field vary according to the DCI formats. In addition, the size of control information matched with the DCI formats varies according to the DCI formats. Any DCI format may be used to transmit two or more kinds of control information.

Table 6 shows an example of control information transmitted by DCI format 0. The bit size of each information field below is merely illustrative and the bit size of each information field is not limited thereto.

TABLE 6

| Information field | Bit(s) |
| --- | --- |
| (1) Flag for format 0/format 1A differentiation | 1 |
| (2) Hoppling flag | 1 |
| (3) Resource block assignment and hopping resource allocation | $\lceil \log_2(N_{RB}^{UL}(N_{RB}^{UL}+1)/2) \rceil$ |

TABLE 6-continued

| Information field | Bit(s) |
| --- | --- |
| (4) Modulation and coding scheme and redundancy version | 5 |
| (5) New data indicator | 1 |
| (6) TPC command for scheduled PUSCH | 2 |
| (7) Cyclic shift for DM RS | 3 |
| (8) UL index (only for TDD) | 2 |
| (9) CQI request | 1 |

The flag field is an information field for differentiating between format 0 and format 1A. That is, DCI format 0 and DCI format 1A have the same payload size and are differentiated by a flag field. For the resource block assignment and hopping resource allocation field, the bit size of the field may vary according to a hopping PUSCH or a non-hopping PUSCH. The resource block assignment and hopping resource allocation field for the non-hopping PUSCH provides $\lceil \log_2(N_{RB}^{UL}(N_{RB}^{UL}+1)/2) \rceil$ bit for resource allocation to the first slot in the UL subframe. Where $N_{RB}^{UL}$ is a number of resource block included in the UL slot, which is decided according to a UL transmission bandwidth set in the cell. Consequently, the payload size of DCI format 0 may vary according to a UL bandwidth. DCI format 1A includes an information field for PDSCH assignment. The payload size of DCI format 1A may also vary according to a DL bandwidth. DCI format 1A provide a reference information bit size for DCI format 0. In a case in which the number of information bits of DCI format 0 is less than that of information bits of DCI format 1A, therefore, '0 is added to DCI format 0 until the payload size of DCI format 0 is equal to the payload size of DCI format 1A. The added '0' fills a padding field of the DCI format.

Figure 7:
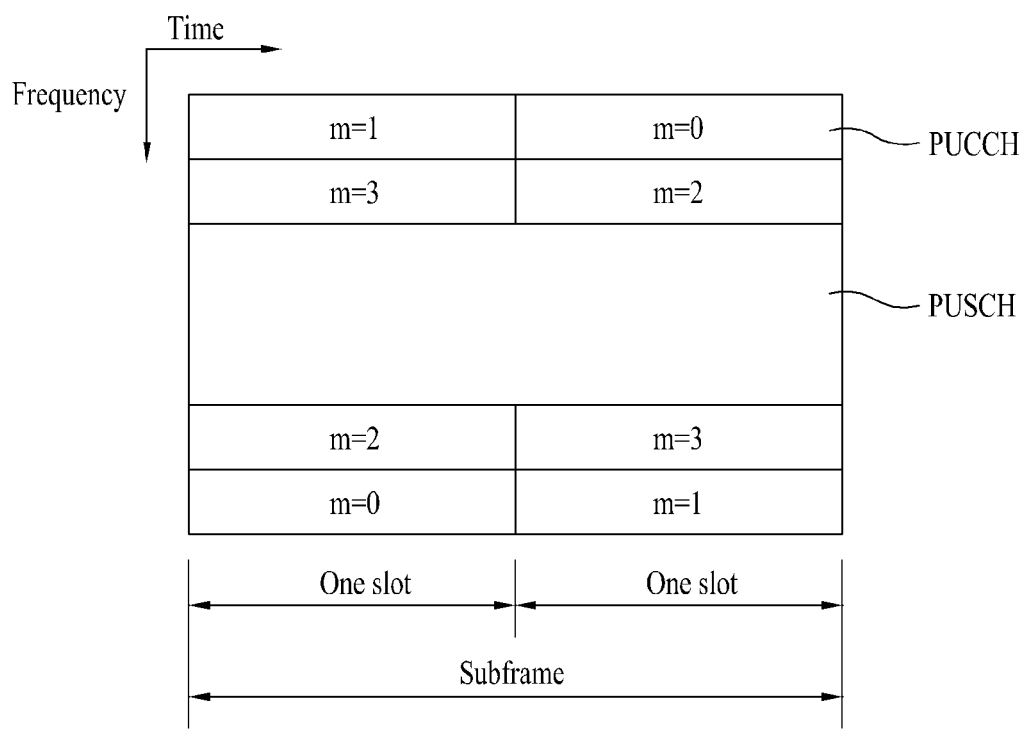
FIG. 7 illustrates a structure of an uplink subframe.

FIG. 7 illustrates a structure of an uplink subframe used in LTE.

Referring to FIG. 7, an uplink subframe includes a plurality of (for example, two) slots. A slot may include a different number of SC-FDMA symbols according to the length of a CP. For example, in case of a normal CP, a slot may include 7 SC-FDMA symbols. In a frequency domain, the uplink subframe is divided into a data region and a control region. The data region includes a PUSCH and is used to transmit a data signal such as a voice. The control region includes a PUCCH and is used to transmit control information. The PUCCH includes an RB pair (for example, m=0, 1, 2, and 3) located at both ends of the data region on a frequency axis and the RB pair is hopped on a slot basis. Control information includes an HARQ ACK/NACK, Channel Quality Information (CQI), a Precoding Matrix Indicator (PMI), and a Rank Indication (RI).

As previously described with reference to FIG. 4, in the FDD or TDD downlink subframes of the 3GPP LTE system, n front OFDM symbols may be used to transmit physical channels, such as a PDCCH, a PHICH, and a PCFICH, for transmitting various kinds of control information and the other OFDM symbols may be used to transmit a physical channel, such as a PDSCH, for data transmission. For example, a value of n may be set to one symbol to a maximum of four symbols according to subframe characteristics and system characteristics (for example, FDD/TDD, system bandwidth, etc.). The number of symbols used to transmit control channels in each subframe may be transmitted to the user equipment in a dynamic fashion through a physical channel, such as a PCFICH, or in a semi-static fashion through Radio Resource Control (RRC) signaling. As described above, the physical channel for transmitting DL/UL scheduling information and various kinds of control information in the LTE system, i.e. the PDCCH, may be transmitted through the control region (for example, the resource region for the control channel) in the subframe. However, PDCCH transmission is limited due to restriction of the number of OFDM symbols corresponding to the control region. Consequently, it may be possible to consider instruction of an enhanced PDCCH (E-PDCCH) which may be freely multiplexed with the PDSCH through Frequency Division Multiplexing (FDM)/Time Division Multiplexing (TDM) in the data region instead of transmitting the PDCCH through symbols separated from the data region (for example, the resource region for the control channel). In order to differentiate between the existing PDCCH and the E-PDCCH, the existing PDCCH may be referred to as a legacy PDCCH (L-PDCCH) in the disclosure.

Figure 8:
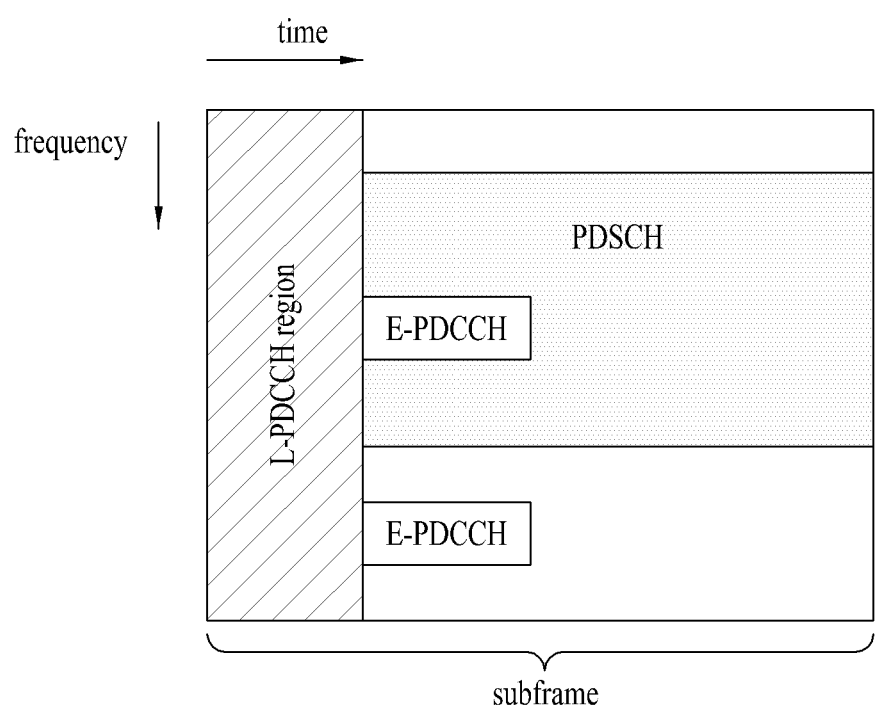
FIG. 8 illustrates an example of multiplexing a legacy PDCCH (L-PDCCH), a PDSCH, and an enhanced PDCCH (E-PDCCH) when the E-PDCCH is applied.

FIG. 8 illustrates an example of multiplexing an L-PDCCH, a PDSCH, and an E-PDCCH when the E-PDCCH is applied.

Referring to FIG. 8, an L-PDCCH region means a region to which a legacy PDCCH may be assigned and may correspond to a control region (see FIG. 4) of the subframe. According to context, the -PDCCH region may means a control channel resource region (i.e. a CCE resource) to which the PDCCH may be really assigned in the control region or a PDCCH search space. On the other hand, the PDCCH may be further assigned in the data region (for example, a resource region for a PDSCH, see FIG. 4). The PDCCH assigned to the data region may be referred to as an E-PDCCH. In the drawing, one E-PDCCH is shown as being included in one slot. However, this configuration is illustrative. The E-PDCCH may be present on a per subframe basis (that is, over two slots). Alternatively, the E-PDCCH may be present on a per subframe basis or on a per slot basis.

As illustrated in FIG. 8, the existing L-PDCCH, the PDSCH, and the E-PDCCH may be multiplexed. At this time, whether the PDCCH is assigned to the L-PDCCH region or the E-PDCCH region (that is, whether the search space for detecting the PDCCH is configured on the L-PDCCH region or the E-PDCCH region) may be set semi-statically through upper layer signaling (for example, RRC signaling). Alternatively, whether the PDCCH (i.e. the search space for detecting the PDCCH) is assigned to (or configured on) the L-PDCCH region or the E-PDCCH region per subframe may be set semi-statically through upper layer signaling (for example, RRC signaling).

More details of the E-PDCCH are as follows. The E-PDCCH may carry DCI. Details of the DCI refer to the above description. For example, the E-PDCCH may carry DL scheduling information and UL scheduling information. An E-PDCCH/PDSCH process and an E-PDCCH/PUSCH process are identical/similar to what was described with reference to steps S107 and S108 of FIG. 1. That is, the user equipment may receive the E-PDCCH and receive data/control information through a PDSCH corresponding to the E-PDCCH. In addition, the user equipment may receive the E-PDCCH and transmit data/control information through a PUSCH corresponding to the E-PDCCH. E-PDCCH transmission processing (for example, channel coding, interleaving, multiplexing, etc.) may be performed using the processing (see FIGS. 5 and 6) defined in the existing LTE within a possible range and may be modified as needed.

On the other hand, the existing LTE adopts a method of pre-reserving a PDCCH candidate region (hereinafter, a PDCCH search space) in the control region and transmitting a PDCCH of a specific user equipment to a portion of the region. Consequently, the user equipment may obtain its own PDCCH in the PDCCH search space through blind decoding. Similarly, the E-PDCCH may also transmitted over some or entirety of the pre-reserved resources.

As previously described, the PDCCH search space for control channel detection includes a common search space (CSS) and a UE-specific search space (USS). In a case in which the E-PDCCH is used, the PDCCH search space may be operated using the following three methods according to control load and/or L-PDCCH interference from the viewpoint of the UE.

First, it may be possible to consider a method (hereinafter, method 1) of configuring both the common search space and the UE-specific search space on the L-PDCCH region. Method 1 is a method used in LTE as previously described. Method 1 may be useful when both burden of the control load and influence of the L-PDCCH interference are relatively small.

Figure 9:
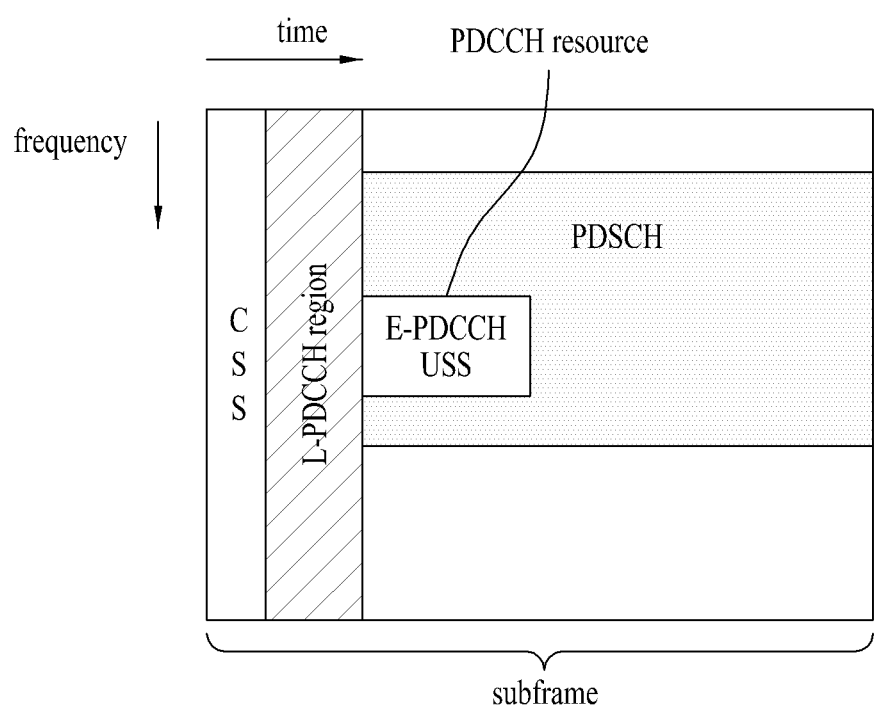
FIG. 9 illustrates a subframe in which a common search space (CSS) is configured on an L-PDCCH region and a UE-specific search space (USS) is configured on an E-PDCCH region.

Next, it may be possible to consider a method (hereinafter, method 2) of configuring the common search space on the L-PDCCH region and configuring the UE-specific search space on the E-PDCCH region. FIG. 9 illustrates a subframe in which a common search space (CSS) is configured on an L-PDCCH region and a UE-specific search space (USS) is configured on an E-PDCCH region according to method 2. In FIG. 9, the CSS is shown as being configured on some contiguous resource regions of the L-PDCCH region. However, this configuration is illustrative. In a practical sense, the CSS may be distributed on some or the entirety of the L-PDCCH region or may be assigned to the entirety of the L-PDCCH region.

In method 2, a downlink grant PDCCH (DL grant PDCCH) scheduling downlink data (DL data) may be transmitted through the UE-specific search space on the E-PDCCH region. A DL data region assigned from the DL grant PDCCH that is transmitted may include a resource (for example, CCE or RE) used to transmit the corresponding PDCCH. For the sake of convenience, the resource used to transmit the corresponding PDCCH may be referred to as a PDCCH resource in the disclosure. In method 2, the assigned DL data region includes the PDCCH resource; however, the UE may know the position of the PDCCH resource by detecting the PDCCH. Consequently, the UE may use the remaining resources of the assigned DL data region excluding the PDCCH resource to receive actual DL data.

Method 2 may be useful when influence of the L-PDCCH interference is small but burden of the control load is large. Alternatively, method 2 may be useful to further improve transmission performance of a UE-specific PDCCH through multi antenna transmission and/or UE-specific DeModulation Reference Signal (DM RS) application.

Figure 10:
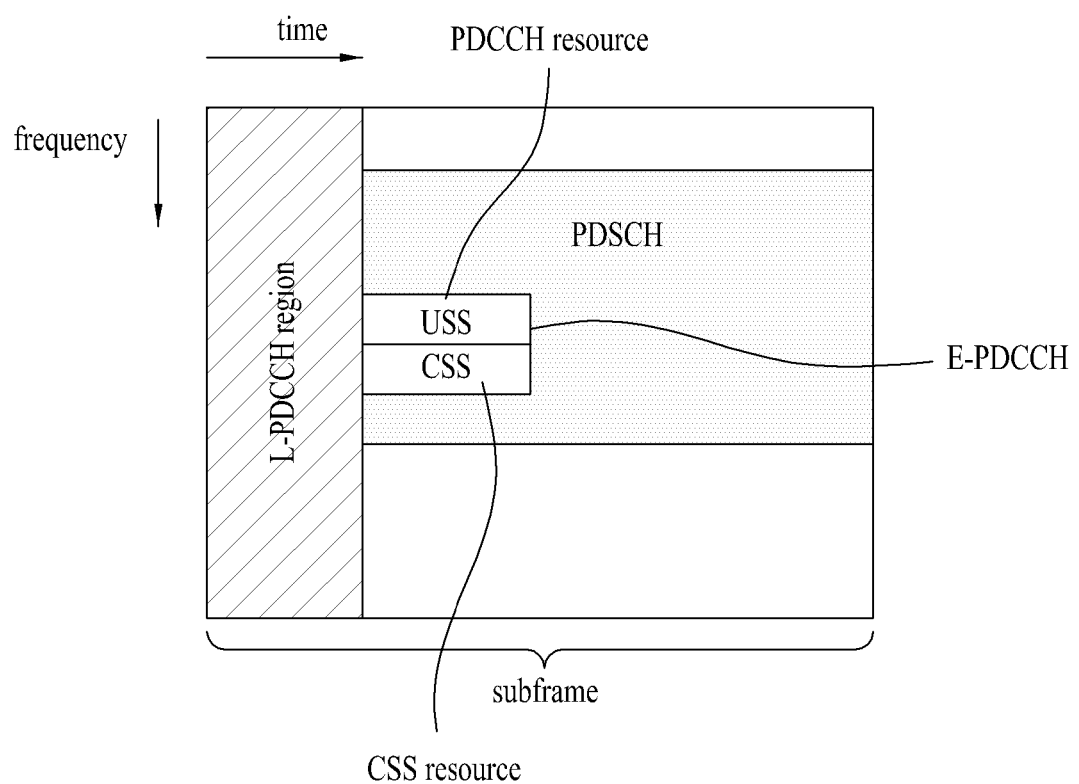
FIG. 10 illustrates a subframe in which both a common search space (CSS) and a UE-specific search space is configured on an E-PDCCH region according to method 3.

Next, it may be possible to consider a method (hereinafter, method 3) of configuring both the common search space and the UE-specific search space on the E-PDCCH region. FIG. 10 illustrates a subframe in which both a common search space (CSS) and a UE-specific search space are configured on an E-PDCCH region according to method 3.

In FIG. 10, a downlink grant PDCCH scheduling downlink data is shown as being transmitted through the UE-specific search space. However, this configuration is illustrative. In method 3, the downlink grant PDCCH may be transmitted through the UE-specific search space or the common search space on the E-PDCCH region. Consequently, the PDCCH resource may correspond to the UE-specific search space, the common search space, or a portion of a combination thereof. In addition, in FIG. 10, the UE-specific search space and the common search space are shown as being separated from each other. However, this configuration is illustrative. The UE-specific search space and the common search space may overlap each other. Method 3 may be useful when burden of the control load and/or influence of the L-PDCCH interference are relatively large.

In method 3, a downlink data region (for example, PDSCH) assigned from the downlink grant PDCCH may overlap a PDCCH resource used to transmit the corresponding PDCCH and/or a source (for example, CCE or RE) constituting the common search space. For the sake of convenience, the source constituting the common search space (CSS) may be referred to as a CSS resource in the disclosure. As mentioned above, the CSS resource may overlap or may be independent of the PDCCH resource. As described above, the position of the PDCCH resource may be known through detection of the corresponding PDCCH from the viewpoint of the UE. However, the CSS resource may be used to transmit control information about another UE or another UE group to which the corresponding UE does not belong or may not be used to transmit the control channel. That is, it may not be possible to know whether or not the CSS resource is used to receive the DL data from the viewpoint of the UE. In a case in which both the common search space and the UE-specific search space are configured on the E-PDCCH region, therefore, a method of determining whether or not the CSS resource is used to the DL data in the DL data region is required.

Hereinafter, a description will be given of embodiments of deciding a resource for receiving the DL data when the DL grant PDCCH scheduling the DL data is transmitted through the UE-specific search space or the common search space on the E-PDCCH region in a case in which both the common search space and the UE-specific search space are configured on the E-PDCCH region. As mentioned above, a resource used to transmit an actual DL grant PDCCH may be referred to as a PDCCH resource and a resource constituting the common search space may be referred to as a CSS resource. According to circumstances, the PDCCH resource and the CSS resource may entirely or partially overlap each other. Alternatively, the PDCCH resource and the CSS resource may be independent of each other.

The following description focuses on a relationship between the base station and the user equipment. However, the present invention may be identically/similarly applied to a relationship between the base station and the relay or between the relay and the user equipment. In the following description, the relationship between the base station and the user equipment may be replaced with the relationship between the base station and the relay or between the relay and the user equipment. From the viewpoint of signal reception, the relay and the user equipment may be generalized as a receiving end. In a case in which the relay operates as the receiving end, an E-PDCCH may be replaced with a Relay-PDCCH (R-PDCCH).

Embodiment 1

Hereinafter, a description will be given of a method of determining whether, in a case in which both a common search space (CSS) and a UE-specific search space are configured on an E-PDCCH region, a CSS resource is used to receive DL data in a DL data region according to an embodiment of the present invention. For the sake of convenience, a description will be given from the viewpoint of a base station. However, corresponding operation may be performed by a user equipment. In addition, this embodiment may also be applied to a case in which only the common search space is configured on the E-PDCCH region.

As previously described, the CSS resource may overlap the DL data region for receiving data. However, it may be not possible to exclude a possibility that the CSS resource may be used to transmit control information about another UE or another UE group with the result that it may not be possible to know whether or not the CSS resource is actually used from the viewpoint of the UE. Consequently, additional signaling may be needed to inform the UE of whether or not the CSS resource is used.

In addition, since the UE does not know whether or not the CSS resource is used, the UE may receive control channel information transmitted through the CSS resource region as DL data. As a result, buffer corruption may occur and, therefore, it may be necessary to re-transmit data.

In this embodiment of the present invention, therefore, only the remaining resources of the DL data region assigned from the DL grant PDCCH excluding the PDCCH resource and the CSS resource may be used to receive actual DL data. According to this embodiment, the remaining resources of the assigned DL data region excluding the CSS resource are used to receive actual DL data and, therefore, additional signaling is not needed and a possibility of data damage may be reduced. Consequently, this embodiment may be advantageous in that deterioration of DL data receiving performance is prevented and increase of signaling overhead is prevented.

In this embodiment, puncturing or rate matching may be applied to the PDCCH resource and the CSS resource which are not included in the resources for receiving actual DL data in the DL data region assigned from the DL grant PDCCH when a DL data signal is generated by the base station. In this case, if the CSS resource is included in the DL data region assigned from the DL grant PDCCH, the user equipment may perform a DL signal receiving process (for example, a decoding process) on the assumption that the corresponding CSS resource has no DL data. For example, in a case in which the CSS resource is included in the DL data region, information corresponding to the CSS resource may be filled with a specific value (for example, 0) during a process of decoding DL data.

Figure 11:
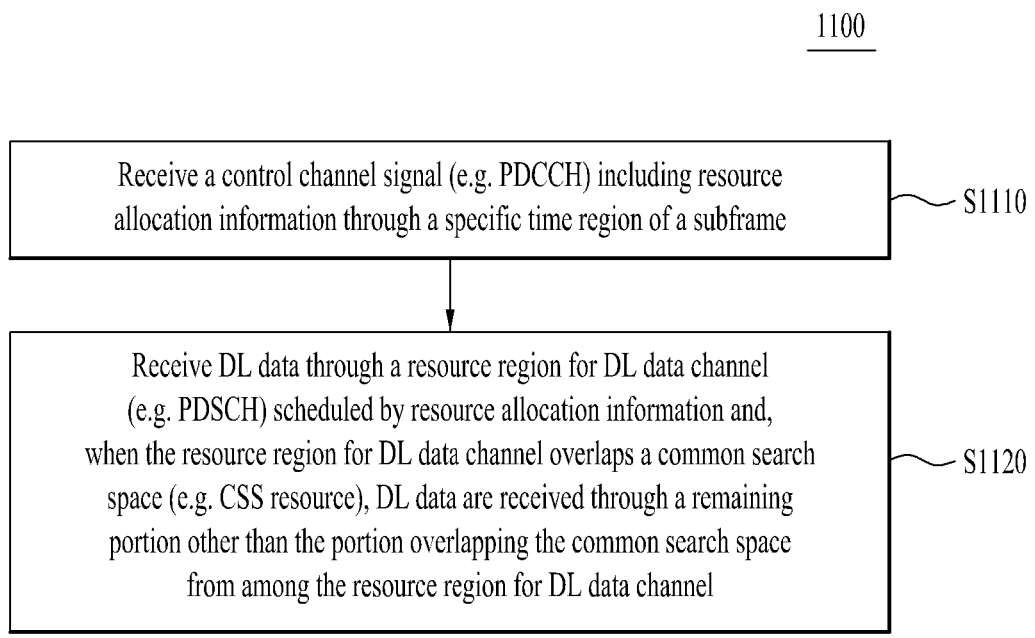
FIG. 11 illustrates a flowchart of a downlink data transmitting method according to an embodiment of the present invention.

FIG. 11 illustrates a flowchart of a downlink data receiving method (1100) in a case in which both the common search space and the UE-specific search space are configured on the E-PDCCH region according to this embodiment. For the sake of convenience, a description is given from the viewpoint of the user equipment. However, corresponding operation may be performed by the base station. As mentioned above, this embodiment may be applied to a case in which only the common search space is configured on the E-PDCCH region.

Referring to FIG. 11, the user equipment may receive a control channel signal including resource allocation information through a specific time region of a subframe (S1110). For example, the user equipment may receive a DL grant PDCCH through an E-PDCCH region configured on a data region of the subframe. In this case, a UE-specific search space and a common search space may be configured on the E-PDCCH region and a DL data region assigned from the DL grant PDCCH may overlap a PDCCH resource and/or a CSS resource.

In addition, the user equipment may receive DL data through a resource region for DL data channel scheduled by the resource allocation information among the specific time region of the subframe. In a case in which the resource region for DL data channel overlaps the common search space, the DL data may be received through the remaining portion excluding the portion overlapping the common search space from among the resource region for DL data channel (S1120). For example, the user equipment may receive DL data through a DL data region scheduled from the DL grant PDCCH. In a case in which the DL data region scheduled from the DL grant PDCCH overlaps the CSS resource, however, the remaining resources excluding the overlapping resource region may be used to receive actual DL data. In addition, the PDCCH resource is also excluded from DL data reception.

In a case in which the overlapping CSS resource and/or PDCCH resource is excluded from DL data reception as mentioned above, the user equipment may perform a DL signal receiving process (for example, a decoding process) on the assumption that the corresponding CSS resource and/or PDCCH resource has no DL data. For example, in a case in which the CSS resource is included in the DL data region, information corresponding to the CSS resource may be filled with a specific value (for example, 0) during a process of decoding DL data.

Embodiment 2

Hereinafter, a description will be given of a method of determining whether, in a case in which both a common search space and a UE-specific search space are configured on an E-PDCCH region, a CSS resource is used to receive DL data in a DL data region according to another embodiment of the present invention. For the sake of convenience, a description will be given from the viewpoint of a base station. However, corresponding operation may be performed by a user equipment. In addition, this embodiment may also be applied to a case in which only the common search space is configured on the E-PDCCH region.

In a case in which the CSS resource is excluded from a resource region for receiving DL data as in the previous embodiment, the CSS resource may not be used to receive DL data even when the CSS resource is not used by another UE or another UE group. In order to efficiently use resources, therefore, it may be necessary to additionally indicate whether the CSS resource is used to receive DL data.

In this embodiment of the present invention, whether the CSS resource will be included in or excluded from a resource used to receive actual DL data in a DL data region assigned from a DL grant PDCCH may be signaled through corresponding L1 (Layer 1)/L2 (Layer 2) signaling (for example, PDCCH) or upper layer signaling (for example, RRC layer message). Even in this case, however, the position of the PDCCH resource may be known through detection of the corresponding PDCCH and the PDCCH resource is excluded from DL data reception. Consequently, it is not necessary to signal whether the PDCCH resource will be included or excluded. That is, in a case in which the resource region in which the DL grant PDCCH is detected and the resource used to receive the DL data overlaps each other, the overlapping PDCCH resource is excluded from actual DL data reception irrespective of signaling proposed by this embodiment.

As described above, the CSS resource may be used to transmit control information about another UE or another UE group according to circumstances. However, the CSS resource may not be used to transmit any control channel. In a case in which the CSS resource is not used for control channel transmission, the CSS resource may be used to transmit DL data. Consequently, informing of whether or not DL data are received through the CSS resource according to this embodiment may be advantageous in terms of efficiency.

In the above embodiment, puncturing or rate matching may be applied to the PDCCH resource and the CSS resource which are not included in the resources for receiving actual DL data in the DL data region assigned from the DL grant PDCCH when a DL data signal is generated by the base station. In a case in which the CSS resource is included in the DL data region assigned from the DL grant PDCCH, the user equipment may perform a DL signal receiving process (for example, a decoding process) on the assumption that the corresponding CSS resource has no DL data. For example, in a case in which the CSS resource is included in the DL data region, information corresponding to the CSS resource may be filled with a specific value (for example, 0) during a process of decoding DL data.

Figure 12:
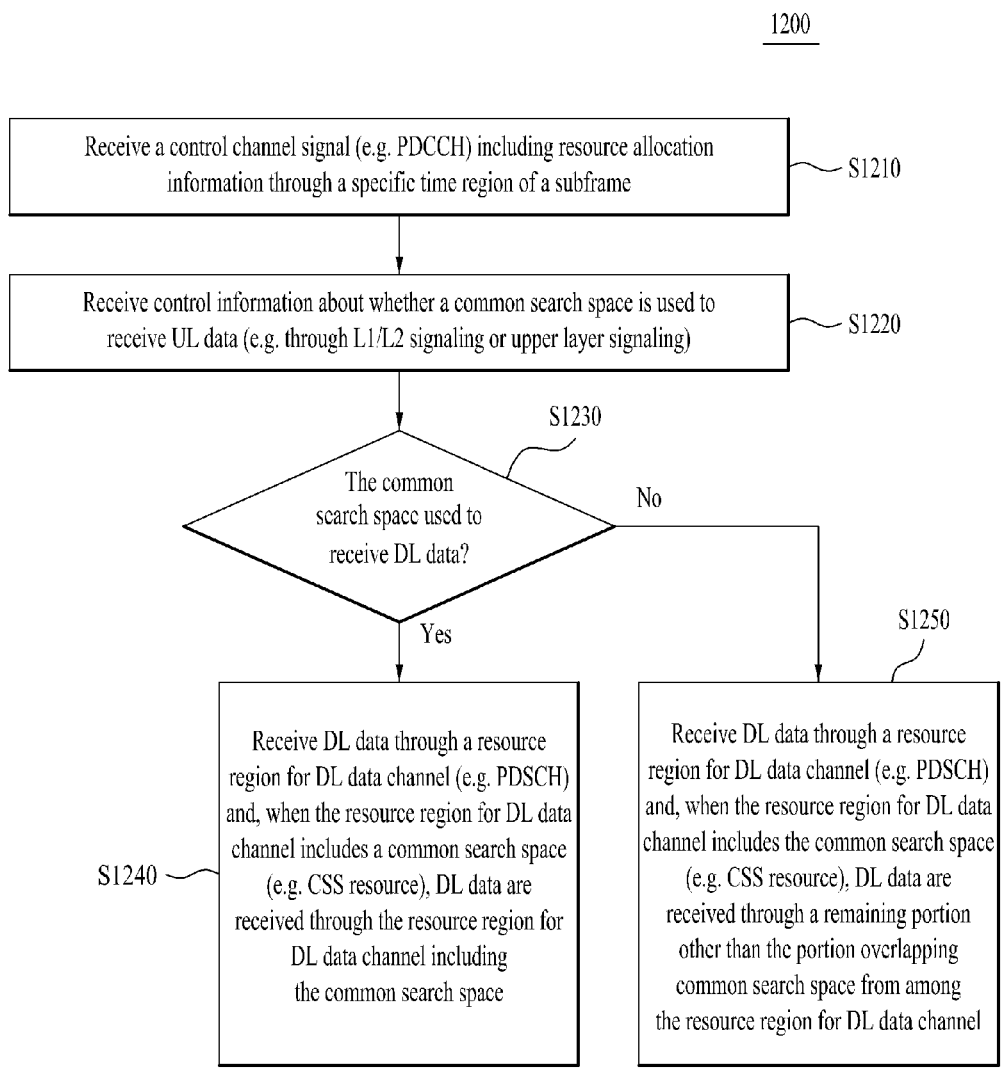
FIG. 12 illustrates a flowchart of a downlink data transmitting method according to another embodiment of the present invention.

FIG. 12 illustrates a flowchart of a downlink data receiving method (1200) in a case in which both the common search space and the UE-specific search space are configured on the E-PDCCH region according to this embodiment. For the sake of convenience, a description is given from the viewpoint of the user equipment. However, corresponding operation may be performed by the base station. As mentioned above, this embodiment may be applied to a case in which only the common search space is configured on the E-PDCCH region.

Referring to FIG. 12, the user equipment may receive a control channel signal including resource allocation information through a specific time region of a subframe (S1210). For example, the user equipment may receive a DL grant PDCCH through an E-PDCCH region configured on a data region of the subframe. In this case, a UE-specific search space and a common search space may be configured on the E-PDCCH region and a DL data region assigned from the DL grant PDCCH may overlap a PDCCH resource and/or a CSS resource.

In addition, the user equipment may receive control information about whether or not the common search space is used to receive UL data (S1220). For example, the common search space may indicate the CSS resource. In addition, for example, information about whether or not the common search space will be used to receive DL data may be received through L1/L2 signaling (for example, PDCCH) or upper layer signaling (for example, RRC layer message).

The user equipment may determine whether the common search space is used to receive DL data based on the received information (S1230).

In a case in which it is indicated that the common search space is used to receive DL data, the common search space overlapping the DL data region among the data region of the subframe may be included in DL data reception when DL data are received through the DL data region scheduled by the resource allocation information (S1240). That is, the DL data may be received through the resource region for DL data channel which includes the common search space. For example, in a case in which it is indicated that the CSS resource is used to receive DL data through the PDCCH or the RRC layer message, the user equipment may use the CSS resource to receive DL data.

On the other hand, in a case in which it is indicated that the common search space is not used to receive DL data, the common search space among the data region of the subframe may be excluded from DL data reception when DL data are received through the DL data region scheduled by the resource allocation information (S1250). For example, in a case in which it is indicated that the CSS resource is not used to receive DL data through the PDCCH or the RRC message, the user equipment may not use the CSS resource to receive DL data. As described above, the user equipment may perform a DL signal receiving process (for example, a decoding process) on the assumption that the excluded CSS resource has no DL data. For example, information corresponding to the excluded CSS resource may be filled with a specific value (for example, 0) during a process of decoding DL data.

Figure 13:
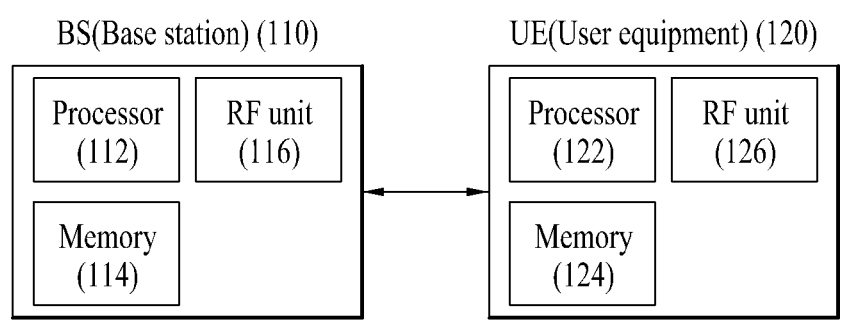
FIG. 13 illustrates a base station, a relay, and a user equipment applicable to the present invention.

FIG. 13 illustrates a base station, a relay, and a user equipment applicable to the present invention.

Referring to FIG. 13, a wireless communication system includes a base station (BS) 110 and a user equipment (UE) 120. In a case in which the wireless communication system includes a relay, the base station or the user equipment may be replaced with the relay.

The base station 110 includes a processor 112, a memory 114, and a radio frequency (RF) unit 116. The processor 112 may be configured to execute procedures and/or methods proposed by the present invention. The memory 114 is connected to the processor 112 to store various kinds of information related to operation of the processor 112. The RF unit 116 is connected to the processor 112 to transmit and/or receive a radio signal. The user equipment 120 includes a processor 122, a memory 124, and an RF unit 126. The processor 122 may be configured to execute procedures and/or methods proposed by the present invention. The memory 124 is connected to the processor 122 to store various kinds of information related to operation of the processor 122. The RF unit 126 is connected to the processor 122 to transmit and/or receive a radio signal.

The embodiments of the disclosure described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

In the embodiments of the present invention, the description mainly focused on a signal transmission and reception relationship between a relay and a base station. Such a signal transmission and reception relationship may be identically or similarly applied to signal transmission and reception between a user equipment and a base station and between a user equipment and a relay. In this disclosure, a specific operation described as being performed by the base station may be performed by an upper node of the base station according to circumstances. That is, it is apparent that, in a network comprised of a plurality of network nodes including a base station, various operations performed for communication with a user equipment may be performed by the base station or network nodes other than the base station. The term 'base station' may be replaced with a fixed station, a Node B, an evolved Node B (eNode B or eNB), an access point, etc. In addition, the term 'user equipment' may be replaced with a mobile station (MS), a mobile subscriber station (MSS), etc.

Embodiments of the present invention may be achieved by various means, for example, hardware, firmware, software, or a combination thereof. In a hardware configuration, an embodiment of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be within the scope of the invention.

INDUSTRIAL APPLICABILITY

The present invention may be used in a wireless communication apparatus, such as a user equipment, a relay, or a base station.

The invention claimed is:

1. A method for receiving downlink data by a user equipment in a wireless communication system, the method comprising:
 receiving a control channel signal comprising resource allocation information through a specific time region in a subframe; and
 receiving the downlink data through a resource region scheduled by the resource allocation information in the specific time region,
 wherein the specific time region corresponds to a region excluding a specific number of front orthogonal frequency division multiplexing (OFDM) symbols within the subframe,
 wherein the specific number of front OFDM symbols is indicated through a physical control format indicator channel (PCFICH), and
 wherein when the resource region scheduled by the resource allocation information overlaps with a common search space for the control channel signal, the downlink data is received through a remaining portion other than a portion overlapping with the common search space from among the resource region scheduled by the resource allocation information.

2. The method according to claim 1, wherein, when the portion overlapping with the common search space from among the resource region scheduled by the resource allocation information is excluded from receiving the downlink data, puncturing or rate matching is applied to the portion overlapping with the common search space.

3. A method for receiving downlink data by a user equipment in a wireless communication system, the method comprising:
 receiving a control channel signal comprising resource allocation information through a specific time region in a subframe;
 receiving control information about whether a common search space for the control channel signal is used to receive the downlink data; and
 receiving the downlink data through a resource region scheduled by the resource allocation information in the specific time region, wherein the specific time region corresponds to a region excluding a specific number of front orthogonal frequency division multiplexing (OFDM) symbols within the subframe, wherein the specific number of front OFDM symbols is indicated through a physical control format indicator channel (PCFICH), and wherein when the resource region scheduled by the resource allocation information overlaps with the common search space for the control channel signal, in case the control information indicates that the common search space is used to receive the downlink data, the downlink data is received through the resource region including a portion overlapping with the common search space, and in case the control information indicates that the common search space is not used to receive the downlink data, the downlink data is received through a remaining portion other than the portion overlapping with the common search space from among the resource region scheduled by the resource allocation information.

4. The method according to claim 3, wherein the control information is received through the control channel signal.

5. The method according to claim 3, wherein the control information is received through a Radio Resource Control (RRC) layer message.

6. An apparatus for wireless communication, comprising:
a processor; and
a radio frequency (RF) unit,
wherein the processor is configured to receive a control channel signal comprising resource allocation information through a specific time region in a subframe, and to receive the downlink data through a resource region scheduled by the resource allocation information in the specific time region,
wherein the specific time region corresponds to a region excluding a specific number of front orthogonal frequency division multiplexing (OFDM) symbols within the subframe, the specific number of front OFDM symbols being indicated through a physical control format indicator channel (PCFICH), and
wherein when the resource region scheduled by the resource allocation information overlaps with a common search space for the control channel signal, the downlink data is received through a remaining portion other than a portion overlapping with the common search space from among the resource region scheduled by the resource allocation information.

7. The apparatus according to claim 6, wherein, when the portion overlapping with the common search space from among the resource region scheduled by the resource allocation information is excluded from receiving the downlink data, puncturing or rate matching is applied to the portion overlapping with the common search space.

8. An apparatus for wireless communication, comprising:
a processor; and a radio frequency (RF) unit,
wherein the processor is configured to receive a control channel signal comprising resource allocation information through a specific time region in a subframe, to receive control information about whether a common search space for the control channel signal is used to receive the downlink data, and to receive the downlink data through a resource region scheduled by the resource allocation information in the specific time region,
wherein the specific time region corresponds to a region excluding a specific number of front orthogonal frequency division multiplexing (OFDM) symbols within the subframe, the specific number of front OFDM symbols being indicated through a physical control format indicator channel (PCFICH), and
wherein when the resource region scheduled by the resource allocation information overlaps with the common search space for the control channel signal,
in case the control information indicates that the common search space is used to receive the downlink data, the downlink data is received through the resource region including a portion overlapping with the common search space, and
in case the control information indicates that the common search space is not used to receive the downlink data, the downlink data is received through a remaining portion other than the portion overlapping with the common search space from among the resource region scheduled by the resource allocation information.

9. The apparatus according to claim 8, wherein the control information is received through the control channel signal.

10. The apparatus according to claim 8, wherein the control information is received through an RRC layer message.

* * * * *